US006443042B1

(12) United States Patent
Caputo et al.

(10) Patent No.: US 6,443,042 B1
(45) Date of Patent: Sep. 3, 2002

(54) METHOD AND APPARATUS FOR MANUFACTURING A WOOD BLIND

(75) Inventors: Thomas A. Caputo, Greensboro; Thomas Buttitta, Jamestown; Richard L. Scott, Summer Field, all of NC (US)

(73) Assignee: Newell Operating Company, Freeport, IL (US)

( * ) Notice: Subject to any disclaimer, the term of this patent is extended or adjusted under 35 U.S.C. 154(b) by 0 days.

(21) Appl. No.: 09/539,761

(22) Filed: Mar. 31, 2000

(51) Int. Cl.[7] .............................. B26D 3/14; B23P 19/04

(52) U.S. Cl. .............................. 83/23; 29/24.5; 83/636; 83/689; 83/917

(58) Field of Search ............................ 83/23, 636, 686, 83/689, 691, 917; 160/73 R, 178.1 R; 29/24.5

(56) References Cited

U.S. PATENT DOCUMENTS

| | | | | | |
|---|---|---|---|---|---|
| 1,616,385 | A | | 2/1927 | Metcalf | |
| 2,200,349 | A | | 5/1940 | Walker | |
| 2,407,554 | A | | 9/1946 | Isserstedt | |
| 2,481,714 | A | | 9/1949 | Bezjian | |
| 2,488,453 | A | | 11/1949 | Vogel | |
| 2,572,224 | A | | 10/1951 | Walker | |
| 2,620,865 | A | | 12/1952 | Isserstedt | |
| 2,690,215 | A | | 9/1954 | Croxen | |
| 3,956,952 | A | * | 5/1976 | Goettel et al. | 83/636 |
| 4,730,372 | A | | 3/1988 | Tsuchida | |
| 4,790,226 | A | | 12/1988 | Tsuchida | |
| 4,799,526 | A | | 1/1989 | Reeves | |
| 4,831,910 | A | * | 5/1989 | Poulsen | 83/917 |
| 4,930,384 | A | * | 6/1990 | Nakatsuji | 83/689 |
| 4,951,728 | A | | 8/1990 | Takano | |
| 4,974,436 | A | * | 12/1990 | Nakatsuji | 83/636 |
| 5,022,296 | A | | 6/1991 | Eschauzier et al. | |
| 5,099,559 | A | | 3/1992 | Lim | |
| 5,165,459 | A | | 11/1992 | Gaber et al. | |
| 5,243,744 | A | | 9/1993 | Nilsson | |
| 5,303,507 | A | | 4/1994 | Oille | |
| 5,349,730 | A | | 9/1994 | Anderson et al. | |
| 5,567,208 | A | | 10/1996 | Larsson et al. | |
| 5,573,051 | A | | 11/1996 | Judkins | |
| 5,957,183 | A | | 9/1999 | Prince | |
| 6,003,218 | A | | 12/1999 | Schumann et al. | 29/24.5 |
| 6,029,553 | A | | 2/2000 | Berntsson et al. | |

FOREIGN PATENT DOCUMENTS

| | | |
|---|---|---|
| EP | 0 378 313 A2 | 1/1990 |
| EP | 0 409 486 A1 | 7/1990 |
| GB | 2 253 230 A | 2/1991 |

* cited by examiner

*Primary Examiner*—W Donald Bray
(74) *Attorney, Agent, or Firm*—Marshall, Gerstein & Borun.

(57) ABSTRACT

An apparatus for forming notches on the edge of a slat; e.g. a wood slat. The apparatus includes a feeding station to feed a slat to a punching station that locates the slat along a longitudinal edge and a leading edge of the slat. A stripper plate positively locates the slat within the punch prior to the notches being punched. A pair of punches having a beveled region with a v-shaped cutout are used to form the lift hole notches.

23 Claims, 3 Drawing Sheets

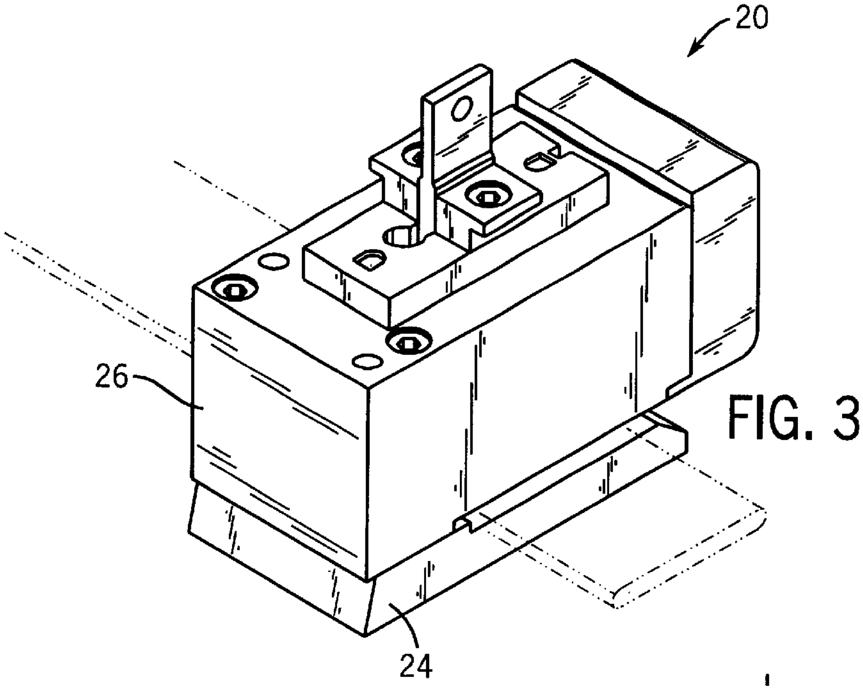
FIG. 3
FIG. 6
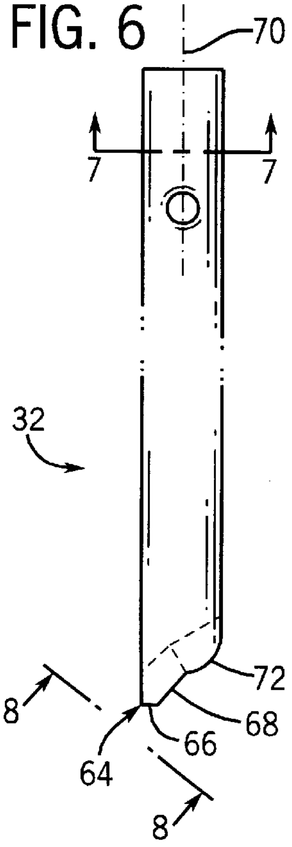
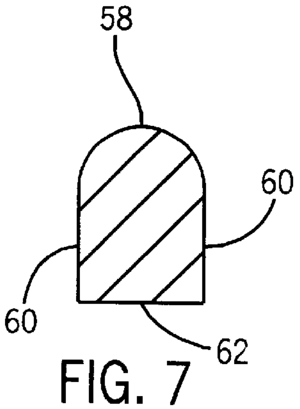
FIG. 7
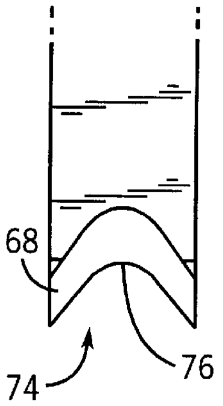
FIG. 8
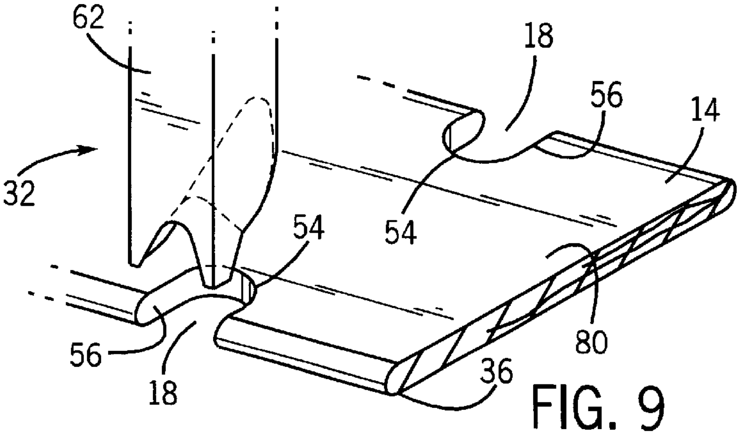
FIG. 9

METHOD AND APPARATUS FOR MANUFACTURING A WOOD BLIND

FIELD OF THE INVENTION

The present invention relates generally to method and apparatus for manufacturing a wood blind, and more particularly a method and apparatus for punching edge notches in a wood slat for a light blocking blind.

BACKGROUND OF THE INVENTION

Venetian blinds include a plurality of slats connected together with at least two ladder cords that sets the spacing of the lift cords and controls the tilting of the slats, from an open to a closed position. Additionally, a venetian blind includes at least two of lift cords that extend through respective lift cord holes in each slat and are attached to a bottom member. The lift cords act to raise and lower the bottom member and the plurality of slats. Typically, the lift cord holes are located halfway between the longitudinal edges of each slat. Since the holes are larger in diameter than the lift cords, light is able to pass through the holes when the blind is in the closed position.

When the slats are in the closed position, each slat overlaps the edge of an adjacent slat. By placing the lift cord holes on the edge of the slats, it is possible to eliminate light from passing through the lift cord holes when the blind is in the closed position. However, this typically requires that a lift cord be placed on either side of the wood slat to ensure that the slats are maintained in a horizontal orientation when the blind is raised. In order to enhance the aesthetic view of the blind, the lift cord pair located on both sides of the slat are in alignment. Therefore, the location of the lift cord holes must also be in alignment.

A number of automated processes have been developed to form a venetian blind from a continuous roll of aluminum slat material. For example U.S. Pat. No. 5,243,744 discloses a machine for producing venetian blinds including a punching device for punching a lift cord hole in an aluminum slat. Unlike, aluminum, wood slats are not produced from a continuous roll of material, But rather are processed as individual strips. While, lift cord holes have been punched in the center of wood slats utilizing a shear punch, this has not proven effective for forming the through holes or notches on the edge of the wood slats. The shear punch works to punch a hole in the center of a wood slat where there is sufficient slat support around the hole. However, utilizing a traditional shear punch on the edge of the slat results in striping or cracking of the slat.

In order to overcome this problem of cracking the slat when forming a notch or hole on the edge of a slat, a router is used to rout the edge notches or by using a saw blade by making a plurality of cuts. However the use of a router or saw, typically requires that each notch be formed independently. Due to lag in the position of automated router equipment, and imprecise positioning of cutting equipment, the notches are subject to being improperly aligned. As a result the lift cord pairs are out of alignment resulting in less aesthetically pleasing blinds. It would therefore, be desirable to form the edge notches in wood slats in a way that minimizes misalignment. Further, it would be desirable to have the benefit of punching an edge notch on a wood slat without cracking or stripping the wood. It would also be desirable to form pairs of notches simultaneously to increase the speed of production.

SUMMARY OF THE INVENTION

Accordingly, a method and apparatus for punching edge notches in a wood slat is provided in which each pair of edge notches is formed simultaneously with a single die to ensure alignment of the edge notches.

According to one exemplary embodiment an apparatus for forming a notch on the edge of a wood slat includes a punch assembly having a die plate, a stripper and a first punch. The die plate includes a support surface to support the bottom surface of the wood slat, and a guide to locate a longitudinal edge of the wood slat. The stripper is movable relative to the wood slat for engagement and disengagement of the top surface of the wood slat. The first punch is movable relative to the wood slat for punching a notch on one longitudinal edge of the wood slat.

In accordance with an exemplary method for forming a notch on an edge of a wood slat, the wood slat is fed to a punching station. The lower surface of the wood slat is located on a die plate. The longitudinal edge of the wood slat is located within a punching station. The wood slat is also located with a stop along a leading edge of the wood slat. A stripper is biased against the upper surface of the wood slat. The edges of the wood slat are punched with a pair of punches. Each punch has a beveled region to form a notch on one of the respective edges of the wood slat.

In accordance with another method for forming a notch on an edge of a slat having a predetermined length, the slat is fed to a punching station. The slat is located within the punching station along a longitudinal edge. The slat is moved along its longitudinal axis to a stop at a predetermined location relative to the punching station. A stripper plate contacts the upper surface of the slat. The slat is punched with a pair of punches to form a notch on each of the respective edges of the slat.

The punch utilized for forming the notches on the slats may include a beveled region having a v-shaped cutout.

BRIEF DESCRIPTION OF THE DRAWINGS

The invention will hereafter be described with reference to the accompanying drawings, wherein like reference numerals denote like elements, and:

FIG. 3 is an isometric view of the punch apparatus;

FIG. 6 is a plan view of the punch of the apparatus of FIG. 3.

FIG. 7 is a cross-sectional view of the punch taken along line 7—7 of FIG. 6;

FIG. 8 is a cross-sectional view of the punch taken along line 8—8 of FIG. 6; and FIG. 9 is a partial view of the punch and slat.

DETAILED DESCRIPTION OF EMBODIMENTS OF THE INVENTION

Figure 1:
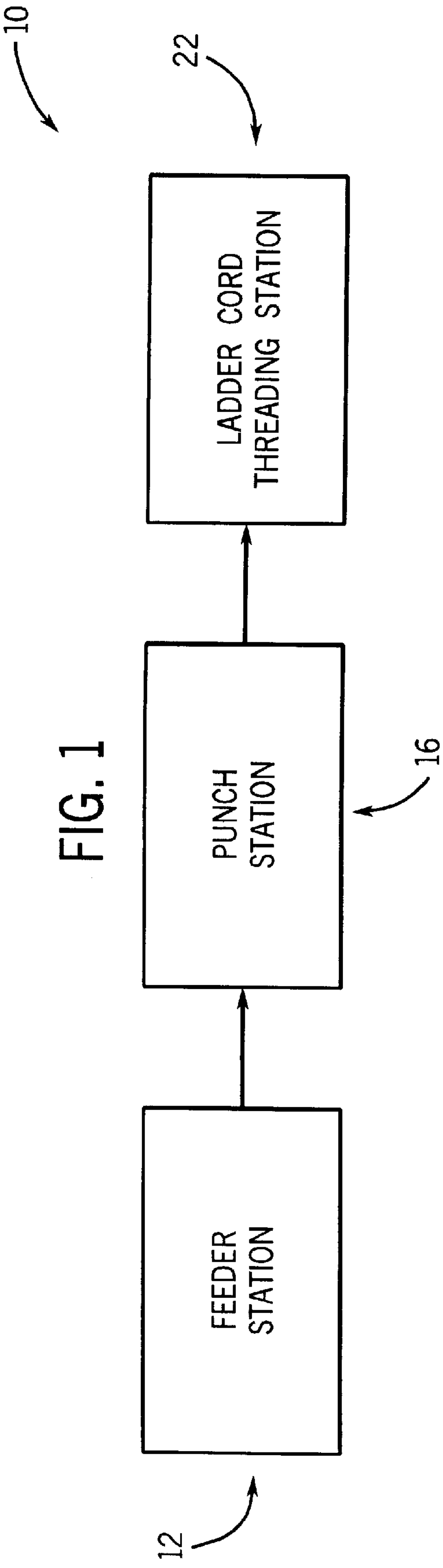
FIG. 1 is a diagram of a venetian blind assembly apparatus.

Referring now to FIG. 1, a diagrammatic view of an apparatus 10 for manufacturing venetian blinds is illustrated. The apparatus includes a slat feeder station 12, in which wood slats 14 previously sized are stored in a magazine and fed one at a time to a punch station 16. A plurality of side notch pairs 18 are punched in each slat 14. The punch station 16 may include a single die/punch assembly 20 or may include a plurality of die/punch assemblies, so that all pairs of edge notches 18 may be stamped simultaneously. Once the edge notches 18 have been formed, the slat 14 is then fed to the ladder cord threading station 22 where the slat 14 is fed into a ladder cord.

Various types of feeder and ladder cord threading stations may be employed. In one exemplary embodiment, the feeder station 12 is model number 216 WA-219 WA manufactured by Sani. Further, the ladder cord threading station 22 is model number 25 NZA 16 A 090 manufactured by Camozzi. Of course other types of feeder and ladder threading stations may be employed.

Figure 4:
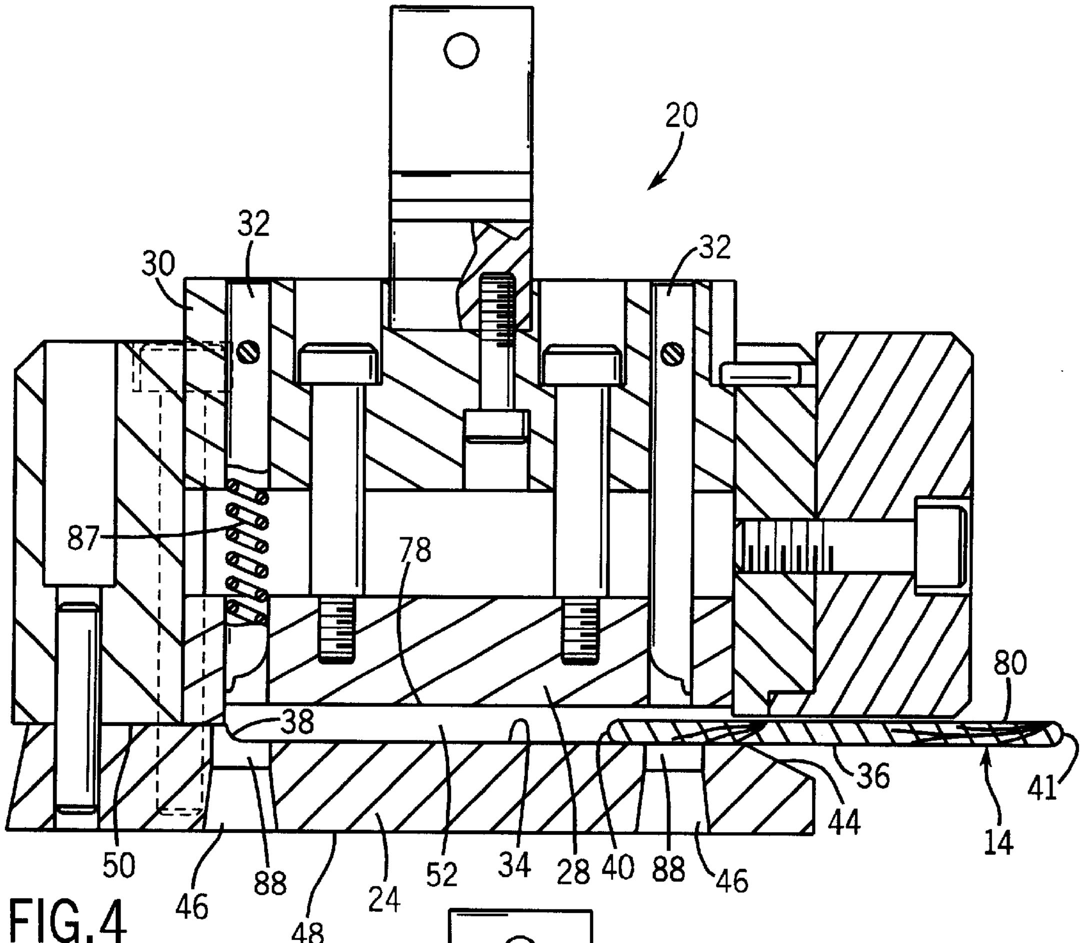
FIG. 4 is a cross-sectional assembly view of the punch apparatus in the raised position.
Figure 5:
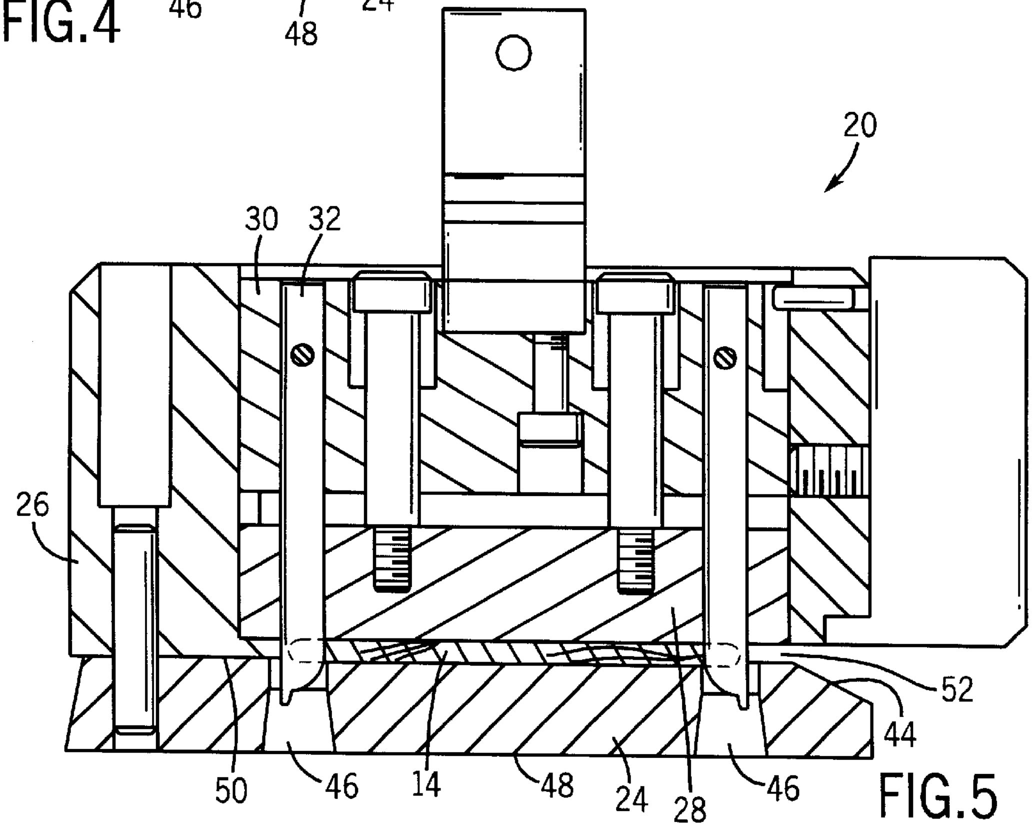
FIG. 5 is a cross-sectional assembly view of the punch apparatus in the lowered position.

Turning now to FIGS. 3–5, the punch station 16 includes a die/punch assembly 20 having a die plate 24 attached to a die housing 26. A spring-biased stripper 28 is movably attached to the die housing 26 to secure the wood slat 14 in die plate 24. A punch holder 30 secures punch 32 and is movable within the die housing 26.

Figure 2:
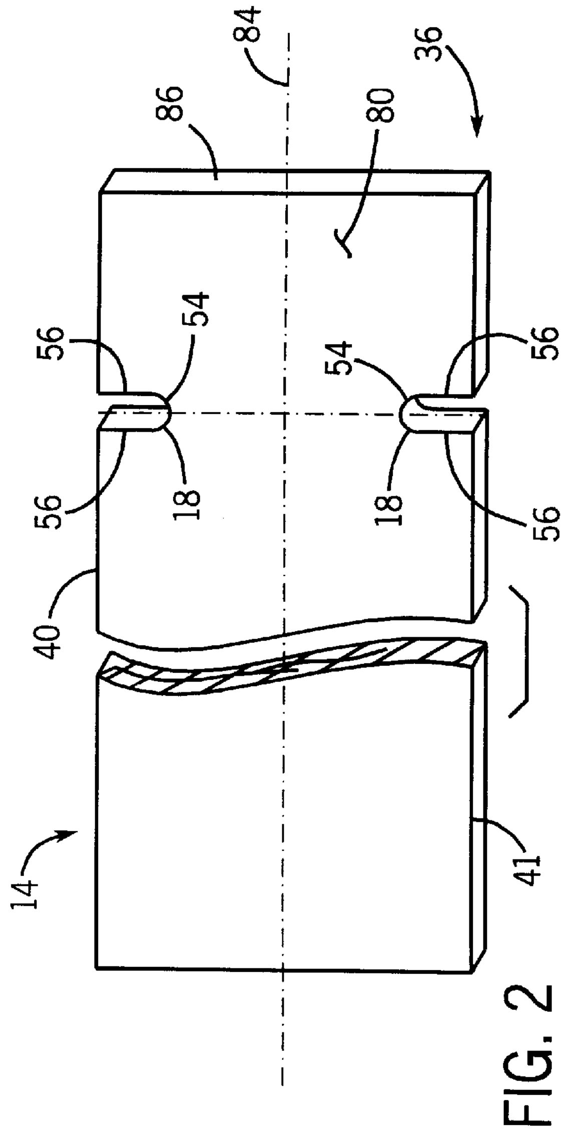
FIG. 2 is a plan view of a blind slat with edge notches.

The die plate 24 includes a top surface 34 for supporting the bottom side 36 of slat 14 (See FIGS. 2 and 9). In the exemplary embodiment the top surface 34 has a flat profile to match the flat profile of the bottom side 36 of the slat 14. However, the top surface 34 could also have a curved profile such as an s-shape, or any other profile to match the bottom profile of the slat 14. Extending upward from the top surface 34 is a die plate guide 38 configured to align a longitudinal edge 40 of slat 14. In the exemplary embodiment, the die plate guide 38 includes a transitional radius 42 extending between the top surface 34 and the die plate guide 38 to match the radius of the slat 14.

Die plate 24 further includes a beveled forward edge 44 of thirty degrees to help guide the slat 14 into the punch station 20. Die plate 24 further includes two through holes 46 having the profile of the notch to be formed in the slat. The through hole 46 extends approximately 0.100 inches from the top surface 34, after which the through hole 46 increases with a taper (e.g. five degrees) to allow the punched material to exit the bottom 48 of the die plate 24.

Die plate 24 is secured to the die housing 26 in a region 50 extending from the guide 38 in a direction away from the beveled edge 44. As illustrated in FIG. 4, a gap 52 is formed between the bottom of the die housing 26 and the top surface 34 of die plate 24. The distance defined by the gap 52 is greater than the greatest effective thickness of the slat 14. The effective thickness is defined as the distance between the lowest point on the lower surface of the slat 14 and highest point of the upper surface of the slat 14. The gap 52 allows the slat 14 to be loaded on to the die plate 24.

Punch holder 30 is movably located within die housing 26. A pair of punches 32 is secured to the punch holder 30. Referring to FIGS. 6–9, each punch 32 has a shape to form the notch 18 in the wood slat 14 having a first arcuate section 54 and two parallel side sections 56. The geometry of each punch can be described as having an arcuate section 58, and two parallel side sections 60 extending from the arcuate section 58. A base portion 62 is connected to and extends between the parallel side sections 60. The tip 64 of punch 32 includes a first land region 66 and a beveled region 68 extending therefrom at a preferred angle of 30 degrees as measured from the land region 66 or 150 degrees as measured from the longitudinal axis 70 of the punch 32. A radius, or curved section 72 extends from the beveled region 68 to the arcuate section 58 of the punch. Further, in the exemplary embodiment the radius section has a radius of 0.1305 inches; however, the radius could be between 0.100 and 0.150 degrees. The function of the radius section is a function of the rounded edge of the punch.

In the exemplary embodiment the arcuate section 58 of each punch 32 has a radius of 0.0780 inches. This dimension sets the arcuate portion 54 of the notch 18 in the wood slat 14. The land region 66 is 0.035 inches; however, the land region 66 could be between 0 and 0.060 inches.

In the exemplary embodiment the beveled region 68 begins 0.076 inches from the edge of the land region 66 and extends 0.064 inches therefrom. The beveled region 68 is at a forty-degree angle; however, the beveled region 68 could extend between 0 and 0.070 inches and be an angle between 15 and 70 degrees from the land region. The function of the beveled region 68 is to decrease the force needed to cut, by giving a shear angle.

The beveled region 68 further includes a v-shaped cutout portion 74. In the preferred embodiment, the v-shape cut out is sixty degrees. However, the cutout could be between 15 and 60 degrees. The function of the v-shaped cutout is to provide clearance for the slug. The cut out could also be a shape other then a "v." For example a "w" shape wold also be effective. The depth of the notch as measured from the land region 66 to the apex 76 of the v-shaped cutout is 0.076 inches.

The length of the parallel side sections 60 of the punch 32 is greater than the length of the parallel sections 56 of the notch 18 formed in the wood slat 14. This is to ensure that the base side 62 of the punch 32 never hits the edges 40, 41 of the slat 14.

Stripper plate 28. secures the slat 14 during the punching operation, to ensure the slat 14 does not move in response to the punching operation. In the exemplary embodiment, stripper plate 28 includes a bottom surface 78 having a flat profile to match the flat profile of the upper surface 80 of slat 14. As with the top surface 34 of the die plate 24, the bottom surface 78 of the stripper plate 28 could also have a curved profile, or any other profile to match the upper profile of the slat 14. Further, the bottom surface 78 may also have a profile that, while not coincident with the upper profile of the slat, has a number of contact areas that would allow the stripper plate 28 to securely locate the slat 14 during the punching operation. Stripper plate 28 includes two through holes 82 having a profile greater than that of the punch 32, to permit the punch 32 to pass therethrough.

Stripper plate 28 is located within die housing 26 for movement toward and away from the die plate 24. A plurality of springs 87 bias the stripper plate 28 against the slat 14 when the stripper plate 28 is in its engaged position. The punch holder 30 is located above the stripper plate 28 and also moves toward and away form the die plate 24 as will be described below.

The operation of forming the edge notches 18 in each slat 14, to produce a light blocking wood venetian blind will now be discussed. The operator first determines, based on the customer's specification, the length of the wood slats and the number of slats required. The wood slats are then cut to the specified length, typically in a single operation to ensure that all of the slats are the same length. Once the slats are sized they are loaded into a magazine in the feeding-station 12. Slats are fed one at a time from a magazine to the punch station 16. (See FIG. 4). Each 14 slat is received within gap 52 of each die/plate assembly 20, such that the leading longitudinal edge 40 of slat 14 abuts against die plate guide 38. In this manner the longitudinal edge 40 of slat 14 is positively located within each punch assembly 20. In the exemplary embodiment, a number of die/punch assemblies 20 are incorporated. The number of die/punch assemblies 20 is equal to the number of lift cord pairs required for the blind. The die/punch assemblies 20 that are not required for a given blind configuration may be idled during the punching operation or may be permitted to cycle even though the slat 14 is not located therein.

Once the slat 14 is located within the die plate 24, the slat 14 is moved forward along its longitudinal axis 84 until the leading edge 86 of the slat 14 abuts a stop. This positively sets the slat 14 within the punch station 16 along the longitudinal edge 40 and the leading edge 86 of the slat 14. Once the slat 14 is located along its longitudinal edge 40 and leading edge 86 punch holder 30 and stripper plate 28 are activated and moved toward the die plate 24 and slat 14.

The stripper plate 28 contacts the upper surface 80 of slat 14 before the punch 32 contacts the slat 14. The springs 87 bias the striper plate 28 against the upper surface 80 of the slat 14 as the punch 32 is moved toward and through the slat 14 to form the notches 18. In this manner Stripper plate 28 biases the slat 14 against the die plate 24 to ensure that the slat 14 does not move during the punching operation. (See FIG. 5). Once the stripper plate 28 is in place against the upper surface 80 of the slat 14, the punch holder 30 moves toward the slat 14 to punch the notches 18 along the edges 40, 41 of the slat 14.

The punch 32 is oriented such that the beveled region 68 strikes the edge 40,41 of the slat 14 first. The punch 32, through a combination of cutting and shearing, forms notches 18 in the wood slat. The material removed from the slat is forced into and through a land area 88 of the through holes 46 in the die plate 24. The punch holder 30 and punch 32 are then retracted, after which the punch 32 and stripper plate 28 are retracted by moving it away from the slat 14 and die plate 24. Once the stripper plate 28 has released the slat 14, the slat 14 is forwarded to the ladder cord threading station 22 for further processing.

The material removed from each slat is trapped within land area 88 until the next slat is punched. The material from the subsequent slat forces the previous material from the land area 88 out the bottom of the die plate 24 to a refuse container.

It should be understood that the foregoing description is of preferred exemplary embodiments of this invention, and that the invention is not limited to the specific forms shown. For example, reference has been made to a wood slat, however, slats made of other materials than wood could also be used with this invention. Notches could be formed on the edges of slats formed from wood composites or Fauxwood (wool alloy with a PVC shell), foam material (pure extruded PVC), or any other material having similar characteristics. Additionally, the method and apparatus described herein could also be used to form notches on the edges of slats formed from fabric, vinyl, or any combination of materials. In the exemplary embodiment described above, the slat thickness is ⅛inch. However, notches could be formed in slats of varying thickness could also be accommodated. Further modifications may be made in the design, arrangement and combination of the elements without departing from the scope of the invention as expressed in the appended claims.

What is claimed is:

1. An apparatus for forming a notch on the edge of a slat having a bottom surface, a top surface, a first and second longitudinal edge, and a leading edge perpendicular to the first and second longitudinal edges, the apparatus comprising:

- a punch assembly including a die plate having a support surface to support the bottom surface of the slat, and a guide to locate a longitudinal edge of the slat;
- a stripper movable relative to the slat for engagement and disengagement of the top surface of the slat; and
- a first punch movable relative to the slat for punching a notch on one longitudinal edge of the slat.

2. The apparatus as recited in claim 1, further including a punch holder securely locating the first punch and a second punch, wherein the second punch punches a notch on the other longitudinal edge of the slat.

3. The apparatus as recited in claim 2, wherein the punch includes an arcuate portion, a pair of parallel sides extending therefrom, and a base portion extending between the parallel sides opposite the arcuate portion.

4. The apparatus as recited in claim 3, wherein the punch includes a tip having a beveled region extending from the base toward the arcuate portion.

5. The apparatus as recited in claim 4, wherein the punch includes a curved section extending from the beveled region toward the arcuate portion.

6. The apparatus as recited in claim 5, wherein the beveled region includes a v-shaped cutout.

7. The apparatus as recited in claim 2, wherein the support surface includes a region proximate the guide having the same profile as the bottom surface of the slat.

8. The apparatus as recited in claim 1, wherein the stripper includes a stripper plate having a lower surface having the same profile as at least a portion of the top surface of the slat.

9. The apparatus as recited in claim 8, wherein the stripper includes a spring to bias the stripper plate against the top surface of the slat.

10. A method of forming a notch on the edge of a slat comprising:

- feeding a slat to a punching station, the slat having a predetermined length, two longitudinal edges extending the length of the slat, a leading edge substantially perpendicular to the longitudinal edges, an upper surface, and a lower surface;
- locating the lower surface of the slat on a die plate;
- locating the slat along a longitudinal edge within a punching station;
- locating the slat along a leading edge with a stop;
- biasing a stripper plate against the upper surface of the slat;
- punching the edges of the slat with a pair of punches, each punch having a beveled region to form a notch on one of the respective edges of the slat.

11. The method as recited in claim 10, wherein the step of feeding a slat to a punching station includes feeding the slat to a plurality of punch/die assemblies, each punch/die assembly including a guide for locating a portion of the longitudinal edge.

12. The method as recited in claim 11 further including moving a stop to a predetermined location relative to the punch/die assemblies prior to locating the slat along the leading edge with the stop.

13. The method as recited in claim 12, wherein punching the edges of the slat with a punch includes first engaging the beveled region of the punch with the longitudinal edge of the slat.

14. The method as recited in claim 13, wherein punching the edges of the slat with a punch includes using a punch having a beveled region with a v-shaped cutout.

15. The method as recited in claim 14, wherein biasing the stripper plate against the upper surface of the slat includes applying a spring force to the stripper plate.

16. A method of forming a notch on the edge of a slat comprising:

feeding a slat to a punching station, the slat having a predetermined length, two longitudinal edges extending the length of the slat, a leading edge substantially perpendicular to the longitudinal edges, an upper surface, and a lower surface;

locating the slat along a longitudinal edge within the punching station;

moving a stop to a predetermined location relative to the punching station;

locating the leading edge of the slat against the stop;

contacting the upper surface of the slat with a stripper plate;

punching the edges of the slat with a pair of punches to form a notch on each of the respective edges of the slat.

17. The method as recited in claim 16, wherein each punch includes a beveled region with a v-shape cutout.

18. The method as recited in claim 16, wherein feeding a slat to a punching station includes feeding the slat to a plurality of punch/die assemblies, each punch/die assembly including a guide for locating a portion of the longitudinal edge.

19. The method as recited in claim 16, wherein punching the edges of the slat with a punch includes first engaging the beveled region of each slat with a respective longitudinal edge of the slat.

20. The method as recited in claim 16, wherein punching the edges of the slat with a punch includes using a punch having a beveled region with a v-shaped cutout, where the beveled region strikes the longitudinal edge of the slat first.

21. The apparatus as recited in claim 1, wherein the slat is formed of wood.

22. The method as recited in claim 10, wherein the slat is formed of wood.

23. The method as recited in claim 16, wherein the slat is formed of wood.

* * * * *